United States Patent
Zheng et al.

(10) Patent No.: US 12,177,850 B2
(45) Date of Patent: Dec. 24, 2024

(54) RESOURCE REQUEST METHOD, RESOURCE ALLOCATION METHOD, DEVICES, AND MEDIUMS

(71) Applicant: VIVO MOBILE COMMUNICATION CO., LTD., Guangdong (CN)

(72) Inventors: Qian Zheng, Guangdong (CN); Xiaodong Yang, Guangdong (CN); Wei Bao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 402 days.

(21) Appl. No.: 17/668,103

(22) Filed: Feb. 9, 2022

(65) Prior Publication Data
US 2022/0191910 A1 Jun. 16, 2022

Related U.S. Application Data

(63) Continuation of application No. PCT/CN2020/109105, filed on Aug. 14, 2020.

(30) Foreign Application Priority Data

Aug. 15, 2019 (CN) .......................... 201910755321.5

(51) Int. Cl.
H04W 72/21 (2023.01)
H04W 28/02 (2009.01)
H04W 40/22 (2009.01)
H04W 88/04 (2009.01)

(52) U.S. Cl.
CPC ....... H04W 72/21 (2023.01); H04W 28/0278 (2013.01); H04W 40/22 (2013.01); H04W 88/04 (2013.01)

(58) Field of Classification Search
CPC ..... H04W 72/21; H04W 72/20; H04W 72/23; H04W 28/0278; H04W 40/22; H04W 88/04
See application file for complete search history.

(56) References Cited

U.S. PATENT DOCUMENTS

2010/0150022 A1 6/2010 Cai et al.
2012/0149298 A1 6/2012 Jiang et al.
(Continued)

FOREIGN PATENT DOCUMENTS

CN 101998621 A 3/2011
CN 102318391 A 1/2012
(Continued)

OTHER PUBLICATIONS

Huawei, HiSilicon; Remaining issues for Triggering and Cancelling D2D BSR and SR; Nov. 17-21, 2014; 3GPP TSG RAN WG2 Meeting #88; R2-145128; 1-3 (Year: 2014).*
(Continued)

Primary Examiner — Farid Seyedvosoghi
(74) Attorney, Agent, or Firm — IP & T GROUP LLP

(57) ABSTRACT

A resource request method includes: receiving information about a scheduling request (SR) resource configured by a network device; sending a first SR on the SR resource in a case that an uplink resource of a remote user equipment is insufficient to send a first buffer status report (BSR), the first SR being used for requesting the network device to allocate a resource used for sending the first BSR to the remote user equipment, the first BSR being used for requesting the network device to allocate a first resource and a second resource, the first resource being a resource used for data transmission from the remote user equipment to a relay user equipment, and the second resource being a resource used for data transmission from the relay user equipment to the network device; and receiving information about the resource used.

14 Claims, 5 Drawing Sheets

(56) References Cited

U.S. PATENT DOCUMENTS

| | | | |
|---|---|---|---|
| 2016/0044653 A1 | 2/2016 | Bagheri et al. | |
| 2017/0013640 A1* | 1/2017 | Loehr | H04W 72/21 |
| 2017/0353819 A1 | 12/2017 | Yin et al. | |
| 2018/0343556 A1 | 11/2018 | Wang et al. | |
| 2021/0360658 A1* | 11/2021 | Shih | H04W 72/1263 |

FOREIGN PATENT DOCUMENTS

| | | |
|---|---|---|
| CN | 107431969 A | 12/2017 |
| CN | 107466068 A | 12/2017 |
| CN | 108370561 B | 2/2021 |
| EP | 2922360 A1 | 9/2015 |
| WO | 2011/123549 A1 | 10/2011 |
| WO | 2016/020881 A1 | 2/2016 |

OTHER PUBLICATIONS

Huawei et al., D2D BSR Triggering and Sending Mechanism, 3GPP TSG RAN WG2 Meeting #86, R2-142229, May 19-May 23, 2014, Seoul, Korea.

Office Action for the Chinese Patent Application No. 201910755321.5 issued by the Chinese Patent Office on Sep. 23, 2022.

Examination Report for the Indian Patent Application No. 202247011554 issued by the Indian Patent Office on Jul. 25, 2022.

Extended European Search Report for the European Patent Application No. 20853284.6 issued by the European Patent Office on Aug. 8, 2022.

Discussion on SR/BSR triggering in multi-hop IAB network, 3GPP TSG-RAN WG2 Meeting #106, May 13-17, 2019, R2-1906538, ASUSTeK, Reno, USA.

International Search Report and Written Opinion of International Application No. PCT/CN2020/109105 issued by the Chinese Patent Office on Nov. 18, 2020.

Office Action for the Korean Patent Application No. 10-2022-7007392 issued by the Korean Intellectual Property Office on Jan. 23, 2024.

Huawei et al., R2-145128, Remaining issues for Triggering and Cancelling D2D BSR and SR, 3GPP TSG RAN WG2 Meeting #88, Nov. 17-21, 2014, 3GPP.

Intel Corporation et al., R2-153961, Sidelink terminology alignment in TS 36.331, 3GPP TSG-RAN WG2 Meeting #91, Aug. 24-28, 2015, 3GPP.

* cited by examiner

RESOURCE REQUEST METHOD, RESOURCE ALLOCATION METHOD, DEVICES, AND MEDIUMS

CROSS-REFERENCE TO RELATED APPLICATIONS

This application is a Bypass Continuation Application of PCT/CN2020/109105 filed on Aug. 14, 2020, which claims priority to Chinese Patent Application No. 201910755321.5 filed on Aug. 15, 2019, which are incorporated herein by reference in their entirety.

TECHNICAL FIELD

The present disclosure relates to the communications field, and in particular, to a resource request method, a resource allocation method, devices, and mediums.

BACKGROUND

Long term evolution (LTE) systems support a sidelink from Release 12, and the sidelink is used for direct data transmission between user equipments (UEs) without going through a network device (e.g., a base station). FIG. 1 is a schematic diagram of direct data transmission between UEs through a sidelink.

Currently, the LTE supports sidelink relay, and "relay" means that a base station or a user does not send a signal to each other directly, but forwards the signal after signal amplification or regeneration processing through a relay node. A simple two-hop relay system, for example, is to divide a "base station to mobile station" link into two links: "base station to relay node" and "relay node—mobile station", so that a poor-quality link can be replaced with two high-quality links, to achieve a higher link capacity and better coverage.

SUMMARY

According to a first aspect, an embodiment of the present disclosure provides a resource request method, applied to a remote user equipment (UE), the method including:
  receiving information about a scheduling request (SR) resource configured by a network device;
  sending a first SR on the SR resource in a case that an uplink resource of the remote UE is insufficient to send a first buffer status report (BSR), the first SR being used for requesting the network device to allocate a resource used for sending the first BSR to the remote UE, the first BSR being used for requesting the network device to allocate a first resource and a second resource, the first resource being a resource used for data transmission from the remote UE to a relay UE, and the second resource being a resource used for data transmission from the relay UE to the network device; and
  receiving information about the resource used for sending the first BSR sent by the network device.

According to a second aspect, an embodiment of the present disclosure provides a resource request method, applied to a remote UE, the method including:
  receiving information about an SR resource configured by a network device;
  sending a second SR on the SR resource in a case that an uplink resource of the remote UE is insufficient to send a second BSR and/or a third BSR, the second SR being used for requesting the network device to allocate a resource used for sending the second BSR and the third BSR to the remote UE, the second BSR being used for requesting the network device to allocate a first resource, the third BSR being used for requesting the network device to allocate a second resource, the first resource being a resource used for data transmission from the remote UE to a relay UE, and the second resource being a resource used for data transmission from the relay UE to the network device; and
  receiving information about the resource used for sending the second BSR and the third BSR sent by the network device.

According to a third aspect, an embodiment of the present disclosure provides a resource allocation method, applied to a network device, the method including:
  sending information about an SR resource to a remote UE;
  receiving a first SR sent by the remote UE on the SR resource, the first SR being used for requesting the network device to allocate a resource used for sending a first BSR to the remote UE, the first BSR being used for requesting the network device to allocate a first resource and a second resource, the first resource being a resource used for data transmission from the remote UE to a relay UE, and the second resource being a resource used for data transmission from the relay UE to the network device;
  allocating, according to the first SR, the resource used for sending the first BSR; and
  sending information about the resource used for sending the first BSR to the remote UE.

According to a fourth aspect, an embodiment of the present disclosure provides a resource allocation method, applied to a network device, the method including:
  sending information about an SR resource to a remote UE;
  receiving a second SR sent by the remote UE on the SR resource, the second SR being used for requesting the network device to allocate a resource used for sending a second BSR and a third BSR to the remote UE, the second BSR being used for requesting the network device to allocate a first resource, the third BSR being used for requesting the network device to allocate a second resource, the first resource being a resource used for data transmission from the remote UE to a relay UE, and the second resource being a resource used for data transmission from the relay UE to the network device;
  allocating, according to the second SR, the resource used for sending the second BSR and the third BSR; and
  sending information about the resource used for sending the second BSR and the third BSR to the remote UE.

According to a fifth aspect, an embodiment of the present disclosure provides a resource request apparatus, applied to a remote UE, the apparatus including:
  a first resource receiving module, configured to receive information about an SR resource configured by a network device;
  a first SR sending module, configured to send a first SR on the SR resource in a case that an uplink resource of the remote UE is insufficient to send a first BSR, the first SR being used for requesting the network device to allocate a resource used for sending the first BSR to the remote UE, the first BSR being used for requesting the network device to allocate a first resource and a second resource, the first resource being a resource used for data transmission from the remote UE to a relay UE, and the second resource being a resource used for data transmission from the relay UE to the network device; and a second resource receiving module, configured to receive information about the resource used for sending the first BSR sent by the network device.

According to a sixth aspect, an embodiment of the present disclosure provides a resource request apparatus, applied to a remote UE, the apparatus including:

a third resource receiving module, configured to receive information about an SR resource configured by a network device;

a second SR sending module, configured to send a second SR on the SR resource in a case that an uplink resource of the remote UE is insufficient to send a second BSR and/or a third BSR, the second SR being used for requesting the network device to allocate a resource used for sending the second BSR and the third BSR to the remote UE, the second BSR being used for requesting the network device to allocate a first resource, the third BSR being used for requesting the network device to allocate a second resource, the first resource being a resource used for data transmission from the remote UE to a relay UE, and the second resource being a resource used for data transmission from the relay UE to the network device; and a fourth resource receiving module, configured to receive information about the resource used for sending the second BSR and the third BSR sent by the network device.

According to a seventh aspect, an embodiment of the present disclosure provides a resource allocation apparatus, applied to a network device, the apparatus including:

a first resource sending module, configured to send information about an SR resource to a remote UE;

a first SR receiving module, configured to receive a first SR sent by the remote UE on the SR resource, the first SR being used for requesting the network device to allocate a resource used for sending a first BSR to the remote UE, the first BSR being used for requesting the network device to allocate a first resource and a second resource, the first resource being a resource used for data transmission from the remote UE to a relay UE, and the second resource being a resource used for data transmission from the relay UE to the network device;

a first resource allocation module, configured to allocate, according to the first SR, the resource used for sending the first BSR; and a second resource sending module, configured to send information about the resource used for sending the first BSR to the remote UE.

According to an eighth aspect, an embodiment of the present disclosure provides a resource allocation apparatus, applied to a network device, the apparatus including:

a third resource sending module, configured to send information about an SR resource to a remote UE;

a second SR receiving module, configured to receive a second SR sent by the remote UE on the SR resource, the second SR being used for requesting the network device to allocate a resource used for sending a second BSR and a third BSR to the remote UE, the second BSR being used for requesting the network device to allocate a first resource, the third BSR being used for requesting the network device to allocate a second resource, the first resource being a resource used for data transmission from the remote UE to a relay UE, and the second resource being a resource used for data transmission from the relay UE to the network device;

a second resource allocation module, configured to allocate, according to the second SR, the resource used for sending the second BSR and the third BSR; and a fourth resource sending module, configured to send information about the resource used for sending the second BSR and the third BSR to the remote UE.

According to a ninth aspect, an embodiment of the present disclosure provides a UE, including a processor, a memory, and a computer program stored in the memory and executable on the processor, where when the computer program is executed by the processor, steps of the foregoing resource request method are implemented.

According to a tenth aspect, an embodiment of the present disclosure provides a network device, including a processor, a memory, and a computer program stored in the memory and executable on the processor, where when the computer program is executed by the processor, steps of the foregoing resource allocation method are implemented.

According to an eleventh aspect, an embodiment of the present disclosure provides a non-transitory computer-readable storage medium, storing a computer program, where when the computer program is executed by a processor, steps of the foregoing resource request method, or the foregoing resource allocation method are implemented.

BRIEF DESCRIPTION OF THE DRAWINGS

For better understanding of the present disclosure, implementations of the present disclosure are described below with reference to the accompanying drawings, and the same or similar reference numerals represent the same or similar features.

DETAILED DESCRIPTION

The following clearly describes embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "and/or" in this specification describes only an association relationship for describing associated objects and represents that three relationships may exist. For example, A and/or B may represent the following three cases: only A exists, both A and B exist, and only B exists.

Usually, remote UE and relay UE can perform direct data transmission. However, before the remote UE and the relay UE perform direct data transmission, the remote UE and the relay UE need to acquire resources for the data transmission. However, in existing communication systems, it is inflexible for the remote UE and the relay UE to acquire resources for data transmission.

Figure 1:
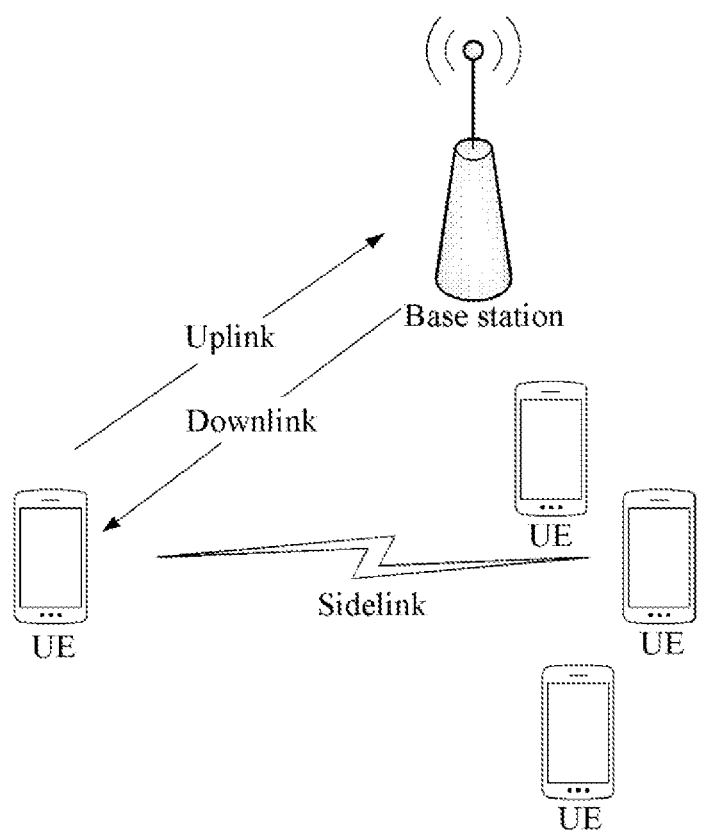
FIG. 1 shows a schematic diagram of direct data transmission between UEs through a sidelink.
Figure 2:
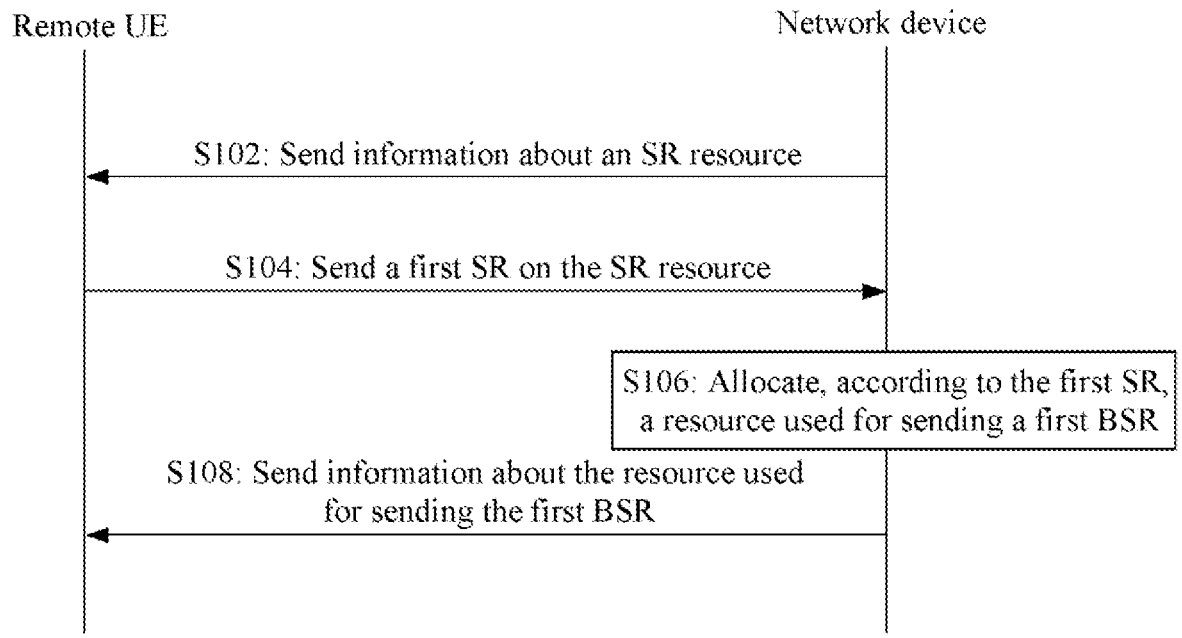
FIG. 2 shows a time sequence diagram of a resource request method according to an embodiment of the present disclosure.

FIG. 2 shows a time sequence diagram of a resource request method according to an embodiment of the present disclosure. As shown in FIG. 2, the resource request method includes the following steps.

S102: A network device sends information about a scheduling request (SR) resource to a remote user equipment (UE), and the remote UE receives the information about the SR resource. The SR resource may be a dedicated SR resource, and the dedicated SR resource is a resource for the remote UE to transmit an SR.

S104: The remote UE sends a first SR on the SR resource in a case that an uplink resource of the remote UE is insufficient to send a first buffer status report (BSR), and the network device receives the first SR. The first SR is used for requesting the network device to allocate a resource used for sending the first BSR to the remote UE, the first BSR is used for requesting the network device to allocate a first resource and a second resource, the first resource is a resource used for data transmission from the remote UE to a relay UE, and the second resource is a resource used for data transmission from the relay UE to the network device.

An example in which the uplink resource of the remote UE is insufficient to send the first BSR may include: the maximum number of transmittable bits of the uplink resource of the remote UE is less than the number of bits required to send the first BSR.

The first BSR is an uplink BSR, and the uplink BSR is used for requesting a base station to allocate a sidelink resource (i.e., the first resource) used for transmitting pending uplink data from the remote UE to the relay UE and an uplink resource (i.e., the second resource) used for transmitting the pending uplink data from the relay UE to the base station.

The resource request method further includes the following steps.

S106: The network device allocates, according to the first SR, a resource used for sending the first BSR.

S108: The network device sends information about the resource used for sending the first BSR to the remote UE, and the remote UE receives the information about the resource used for sending the first BSR.

In this embodiment of the present disclosure, in a case that an uplink resource of a remote UE is insufficient to send a first BSR, a first SR is sent to request a resource used for sending the first BSR, so that the first BSR is sent by using the resource. The first BSR can be used for requesting a first resource for data transmission from the remote UE to a relay UE and a second resource for data transmission from the relay UE to a network device, that is, the remote UE can not only request the first resource required for data transmission thereof, but also request the second resource required for data transmission of the relay UE without requiring each of the remote UE and the relay UE to request a resource. Therefore, the resource acquisition becomes more flexible and the resource acquisition efficiency is improved.

Figure 3:
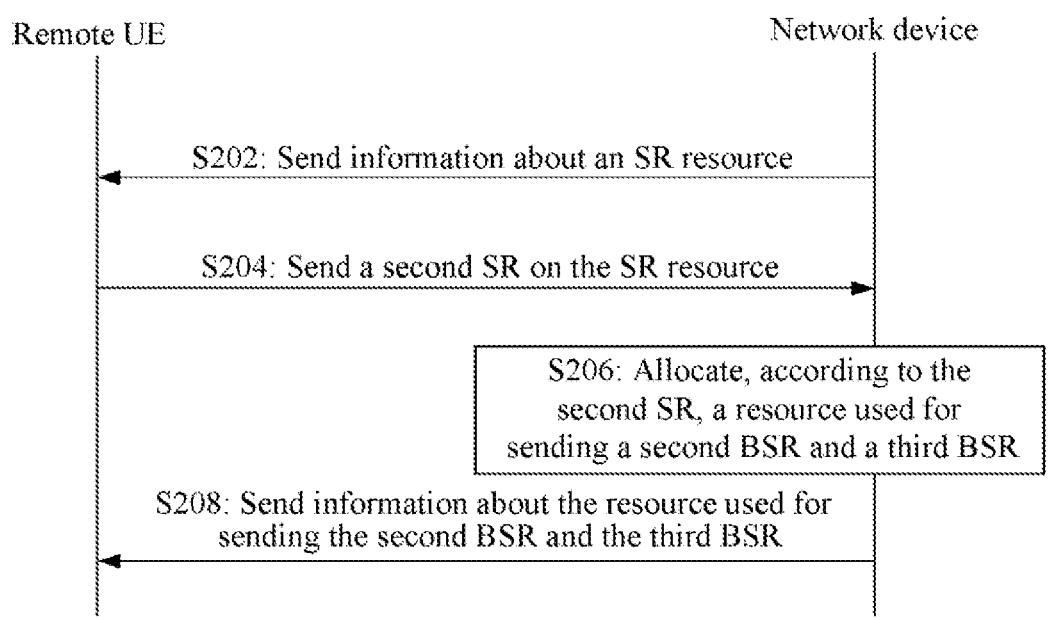
FIG. 3 shows a time sequence diagram of a resource request method according to another embodiment of the present disclosure.

FIG. 3 shows a time sequence diagram of a resource request method according to another embodiment of the present disclosure.

As shown in FIG. 3, the resource request method includes the following steps.

S202: A network device sends information about an SR resource to a remote UE, and the remote UE receives the information about the SR resource. The SR resource may be a dedicated SR resource.

S204: Send a second SR on the SR resource in a case that an uplink resource of the remote UE is insufficient to send a second BSR and/or a third BSR.

The second SR is used for requesting the network device to allocate a resource used for sending the second BSR and the third BSR to the remote UE, the second BSR is used for requesting the network device to allocate a first resource, the third BSR is used for requesting the network device to allocate a second resource, the first resource is a resource used for data transmission from the remote UE to a relay UE, and the second resource is a resource used for data transmission from the relay UE to the network device.

An example in which the uplink resource of the remote UE is insufficient to send the second BSR may include: the maximum number of transmittable bits of the uplink resource of the remote UE is less than the number of bits required to send the second BSR.

An example in which the uplink resource of the remote UE is insufficient to send the third BSR may include: the maximum number of transmittable bits of the uplink resource of the remote UE is less than the number of bits required to send the third BSR.

An example in which the uplink resource of the remote UE is insufficient to send the second BSR and the third BSR may include: the maximum number of transmittable bits of the uplink resource of the remote UE is less than a threshold, and the threshold is a sum of the number of bits required to send the second BSR and the number of bits required to send the third BSR.

The second BSR may be a sidelink BSR, the third BSR may be an uplink BSR, the first resource may be a sidelink resource, and the second resource may be an uplink resource.

The resource request method further includes the following steps.

S206: The network device allocates, according to the second SR, a resource used for sending the second BSR and the third BSR.

S208: The network device sends information about the resource used for sending the second BSR and the third BSR to the remote UE, and the remote UE receives the information about the resource used for sending the second BSR and the third BSR.

In this embodiment of the present disclosure, in a case that an uplink resource of a remote UE is insufficient to send at least one BSR of a second BSR or a third BSR, a second SR is sent to request a resource used for sending the second BSR and the third BSR, so that the second BSR and the third BSR are sent by using the resource. The second BSR and the third BSR are respectively used for requesting a first resource for data transmission from the remote UE to a relay UE and a second resource for data transmission from the relay UE to a network device, that is, the remote UE can not only request the first resource required for data transmission thereof, but also request the second resource required for data transmission of the relay UE without requiring each of the remote UE and the relay UE to request a resource. Therefore, the resource acquisition becomes more flexible and the resource acquisition efficiency is improved.

In the embodiment of FIG. 2 or FIG. 3, the resource request method may further include:
canceling sending of all pending SRs and/or stopping an SR prohibit timer in a case that the remote UE meets a condition for canceling SRs,
the condition for canceling SRs including at least one of: reselecting a relay UE, stopping a relay operation, or switching from a relay communication mode to a non-relay communication mode.

The relay UE re-selection includes at least one of: relay UE re-selection due to a sidelink measurement result being lower than a threshold, relay UE re-selection caused by an upper layer reason, or relay UE re-selection due to the relay UE stopping providing a service for the remote UE.

The relay stop operation includes: termination of communication with the network device, or direct communication with the network device without going through the relay UE.

For the embodiment of FIG. 2, the all canceled pending SRs include the first SR in the embodiment of FIG. 2. For the embodiment of FIG. 3, the all canceled pending SRs include the second SR in the embodiment of FIG. 2.

Figure 4:
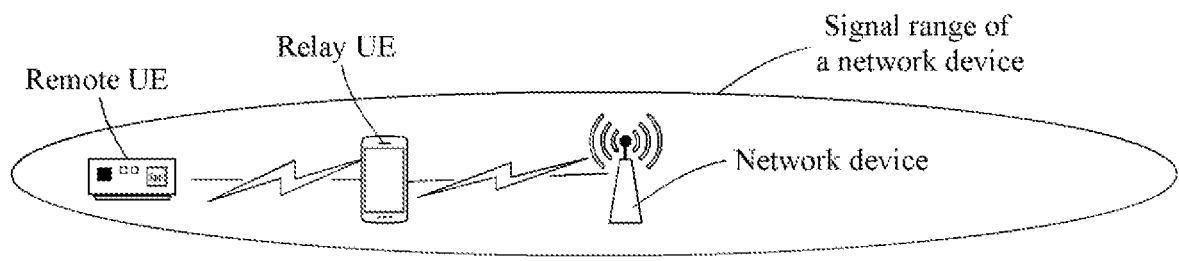
FIG. 4 shows a schematic diagram of a communication scenario according to an embodiment of the present disclosure.

FIG. 4 shows a schematic diagram of a communication scenario according to an embodiment of the present disclosure, and the embodiment of FIG. 2 or FIG. 3 is applied to the communication scenario. As shown in FIG. 4, a remote UE and a relay UE are within a signal coverage of a network device. The remote UE is connected to the relay UE through a PC5 radio interface (corresponding to a sidelink), and the relay UE is connected to the network device through a Uu radio interface (corresponding to an uplink plus a downlink). 1) Both the remote UE and the relay UE are in a radio resource control (RRC) connection state. 2) Uplink data of the remote UE is forwarded to a base station through the relay UE.

A lone term evolution (LTE) sidelink is designed for a specific public safety affair (e.g., emergency communication at a disaster site such as a fire or an earthquake), vehicle to everything (V2X) communication, or the like. The V2X communication includes various services, for example, basic security communication, advanced (autonomous) driving, formation, or sensor expansion. Because the LTE sidelink only supports broadcast communication, it is mainly used for basic security communication. Other advanced V2X services with a strict requirement for quality of service (QoS) in terms of delay, reliability, or the like are supported by a new radio (NR) sidelink.

Figure 5:
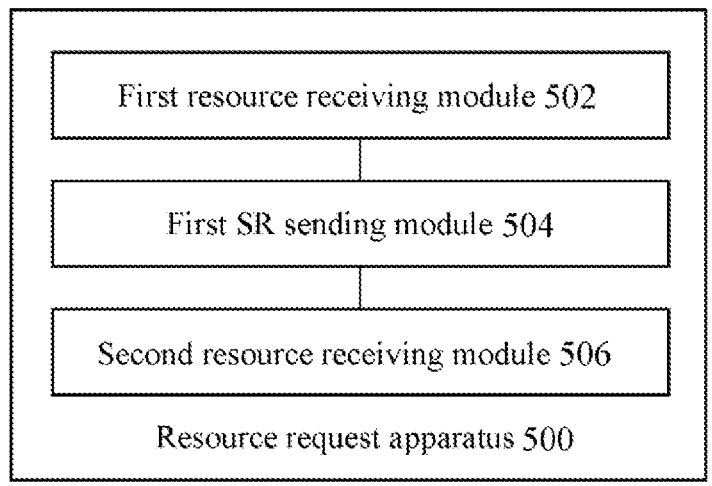
FIG. 5 shows a schematic structural diagram of a resource request apparatus according to an embodiment of the present disclosure.

FIG. 5 shows a schematic structural diagram of a resource request apparatus 500 according to an embodiment of the present disclosure.

As shown in FIG. 5, the resource request apparatus 500 includes:
a first resource receiving module 502, configured to receive information about an SR resource configured by a network device;
a first SR sending module 504, configured to send a first SR on the SR resource in a case that an uplink resource of a remote UE is insufficient to send a first BSR, the first SR being used for requesting the network device to allocate a resource used for sending the first BSR to the remote UE, the first BSR being used for requesting the network device to allocate a first resource and a second resource, the first resource being a resource used for data transmission from the remote UE to a relay UE, and the second resource being a resource used for data transmission from the relay UE to the network device; and
a second resource receiving module 506, configured to receive information about the resource used for sending the first BSR sent by the network device.

In an embodiment of the present disclosure, the resource request apparatus 500 may further include:
a first cancellation module, configured to cancel sending of all pending SRs and/or stop an SR prohibit timer in a case that the remote UE meets a condition for canceling SRs, the condition for canceling SRs including at least one of: reselecting a relay UE, stopping a relay operation, or switching from a relay communication mode to a non-relay communication mode.

Figure 6:
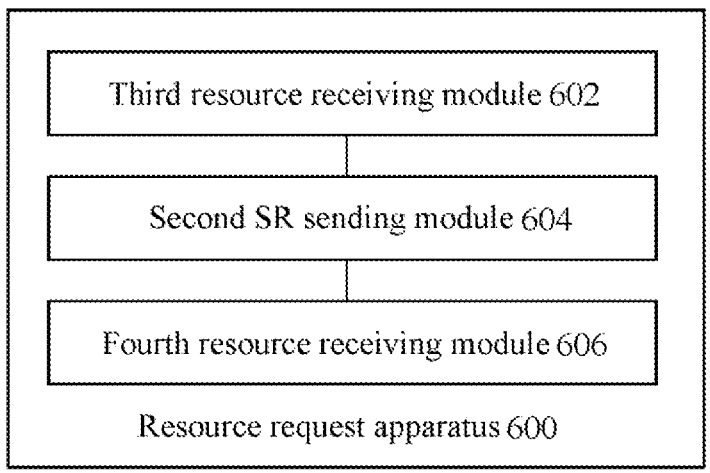
FIG. 6 shows a schematic structural diagram of a resource request apparatus according to another embodiment of the present disclosure.

FIG. 6 shows a schematic structural diagram of a resource request apparatus 600 according to another embodiment of the present disclosure.

As shown in FIG. 6, the resource request apparatus 600 includes:
a third resource receiving module 602, configured to receive information about an SR resource configured by a network device;
a second SR sending module 604, configured to send a second SR on the SR resource in a case that an uplink resource of a remote UE is insufficient to send a second BSR and/or a third BSR, the second SR being used for requesting the network device to allocate a resource used for sending the second BSR and the third BSR to the remote UE, the second BSR being used for requesting the network device to allocate a first resource, the third BSR being used for requesting the network device to allocate a second resource, the first resource being a resource used for data transmission from the remote UE to a relay UE, and the second resource being a resource used for data transmission from the relay UE to the network device; and
a fourth resource receiving module 606, configured to receive information about the resource used for sending the second BSR and the third BSR sent by the network device.

In an embodiment of the present disclosure, the resource request apparatus 600 may further include:
a second cancellation module, configured to cancel sending of all pending SRs and/or stop an SR prohibit timer in a case that the remote UE meets a condition for canceling SRs, the condition for canceling SRs including at least one of: reselecting a relay UE, stopping a relay operation, or switching from a relay communication mode to a non-relay communication mode.

Figure 7:
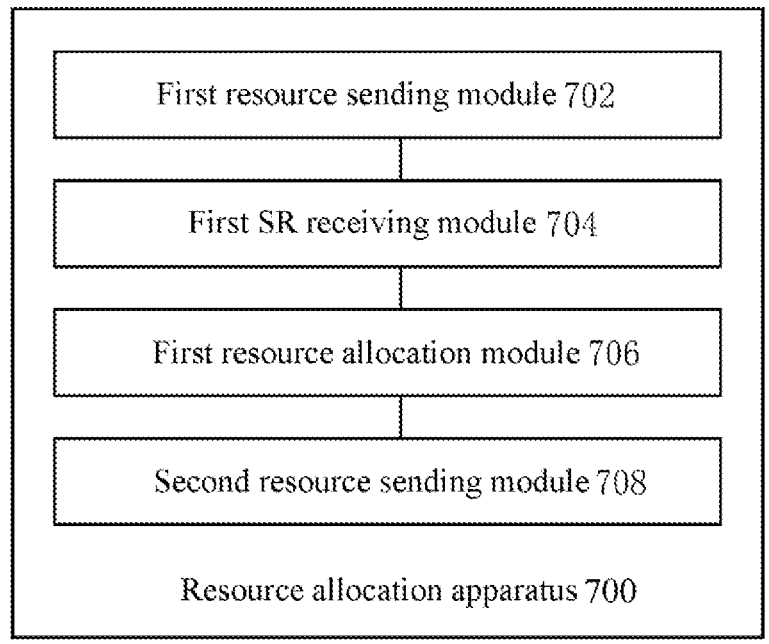
FIG. 7 shows a schematic structural diagram of a resource allocation apparatus according to an embodiment of the present disclosure.

FIG. 7 shows a schematic structural diagram of a resource allocation apparatus 700 according to an embodiment of the present disclosure, and the resource allocation apparatus is applied to a network device.

As shown in FIG. 7, the resource allocation apparatus 700 includes:
a first resource sending module 702, configured to send information about an SR resource to a remote UE;
a first SR receiving module 704, configured to receive a first SR sent by the remote UE on the SR resource, the first SR being used for requesting the network device to allocate a resource used for sending a first BSR to the remote UE, the first BSR being used for requesting the network device to allocate a first resource and a second resource, the first resource being a resource used for data transmission from the remote UE to a relay UE, and the second resource being a resource used for data transmission from the relay UE to the network device;
a first resource allocation module 706, configured to allocate, according to the first SR, the resource used for sending the first BSR; and
a second resource sending module 708, configured to send information about the resource used for sending the first BSR to the remote UE.

Figure 8:
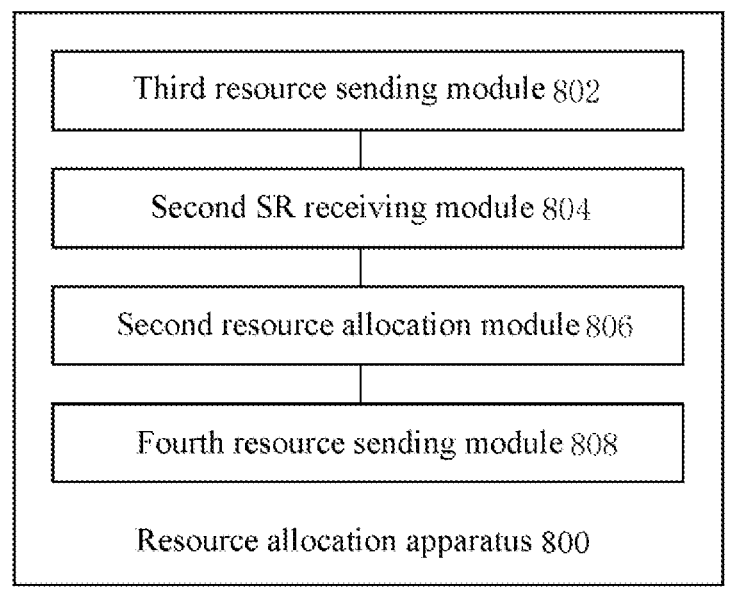
FIG. 8 shows a schematic structural diagram of a resource allocation apparatus according to another embodiment of the present disclosure.

FIG. 8 shows a schematic structural diagram of a resource allocation apparatus 800 according to another embodiment of the present disclosure, and the resource allocation apparatus is applied to a network device.

As shown in FIG. 8, the resource allocation apparatus 800 includes:
a third resource sending module 802, configured to send information about an SR resource to a remote UE;
a second SR receiving module 804, configured to receive a second SR sent by the remote UE on the SR resource, the second SR being used for requesting the network device to allocate a resource used for sending a second BSR and a third BSR to the remote UE, the second BSR being used for requesting the network device to allocate a first resource, the third BSR being used for requesting the network device to allocate a second resource, the first resource being a resource used for data transmission from the remote UE to a relay UE, and the second resource being a resource used for data transmission from the relay UE to the network device;
a second resource allocation module 806, configured to allocate, according to the second SR, the resource used for sending the second BSR and the third BSR; and
a fourth resource sending module 808, configured to send information about the resource used for sending the second BSR and the third BSR to the remote UE.

An embodiment of the present disclosure further provides a UE, including a processor, a memory, and a computer program stored in the memory and executable on the processor, where when the computer program is executed by the processor, various processes of the embodiments of the foregoing resource request method are implemented, and can achieve the same technical effects. To avoid repetition, details are not described herein again.

An example is used below for description of the UE provided by this embodiment of the present disclosure.

Figure 9:
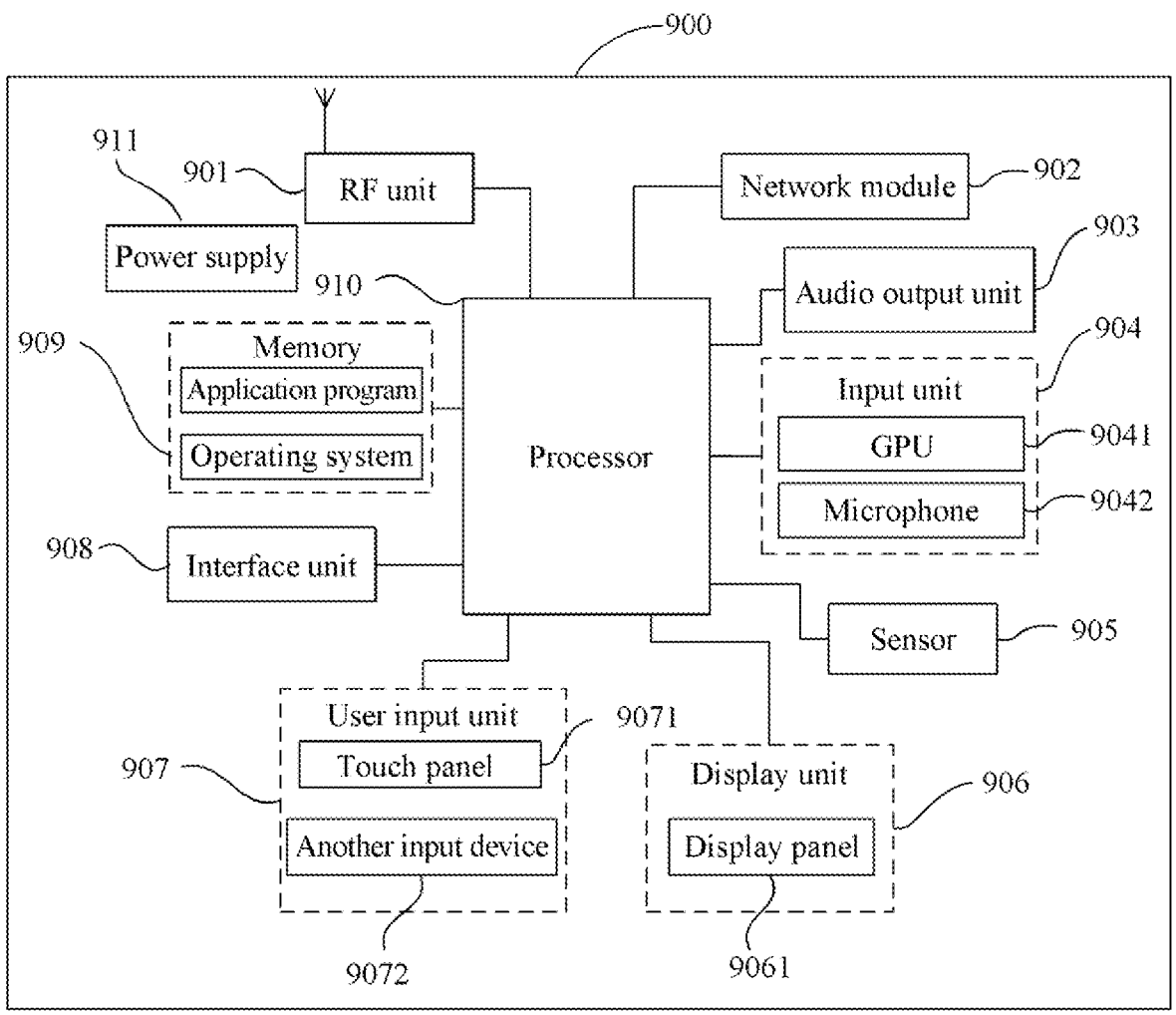
FIG. 9 shows a schematic structural diagram of hardware of a user equipment (UE) according to an embodiment of the present disclosure.

FIG. 9 shows a schematic structural diagram of hardware of a UE 900 according to an embodiment of the present disclosure. The UE 900 includes, but is not limited to, components such as a radio frequency (RF) unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the UE shown in FIG. 9 does not constitute a limitation to the UE, and the UE may include more components or fewer components than those shown in the figure, or some components may be combined, or a different component deployment may be used. In this embodiment of the present disclosure, the UE includes, but is not limited to, a mobile phone, a tablet computer, a notebook computer, a palmtop computer, a vehicle-mounted terminal, a wearable device, a pedometer, and the like.

The RF unit 901 is configured to receive information about an SR resource configured by a network device; send a first SR on the SR resource in a case that an uplink resource of a remote UE is insufficient to send a first BSR, the first SR being used for requesting the network device to allocate a resource used for sending the first BSR to the remote UE, the first BSR being used for requesting the network device to allocate a first resource and a second resource, the first resource being a resource used for data transmission from the remote UE to a relay UE, and the second resource being a resource used for data transmission from the relay UE to the network device; and receive information about the resource used for sending the first BSR sent by the network device.

In this embodiment of the present disclosure, in a case that an uplink resource of a remote UE is insufficient to send a first BSR, a first SR is sent to request a resource used for sending the first BSR, so that the first BSR is sent by using the resource. Because the first BSR can be used for requesting a first resource for data transmission from the remote UE to a relay UE and a second resource for data transmission from the relay UE to a network device, that is, the remote UE can request the first resource and the second resource at one time, the resource acquisition becomes more flexible and the resource acquisition efficiency is improved.

It should be understood that, in this embodiment of the present disclosure, the RF unit 901 is configured to receive and send a signal during an information receiving and sending process or a call process. For example, the RF unit 501 is configured to receive downlink data from a base station, and then send the downlink data to the processor 910 for processing; and in addition, send uplink data to the base station. Generally, the RF unit 901 includes, but is not limited to, an antenna, at least one amplifier, a transceiver, a coupler, a low noise amplifier, a duplexer, and the like. In addition, the RF unit 901 may further communicate with a network device or another device through a wireless communications system.

The UE provides wireless broadband Internet access for a user by using the network module 902. For example, the UE helps the user to receive and send an email, browse a webpage, and access stream media, and the like.

The audio output unit 903 may convert audio data received by the RF unit 901 or the network module 902, or stored in the memory 909 into an audio signal and output the audio signal as a sound. In addition, the audio output unit 903 may further provide an audio output (for example, a call signal receiving sound or a message receiving sound) related to a specific function executed by the UE 900. The audio output unit 903 includes a loudspeaker, a buzzer, a receiver, and the like.

The input unit 904 is configured to receive an audio signal or a video signal. The input unit 904 may include a graphics processing unit (GPU) 9041 and a microphone 9042. The GPU 9041 is configured to process image data of a static picture or a video obtained by an image capture apparatus (for example, a camera) in a video capture mode or an image capture mode. An image frame that has been processed may be displayed on the display unit 906. The image frame that has been processed by the GPU 9041 may be stored in the memory 909 (or another storage medium) or sent by using the RF unit 901 or the network module 902. The microphone 9042 may receive a sound, and can process the sound into audio data. The processed audio data may be converted, in a phone talk mode, into a format that may be sent to a mobile communication base station through the RF unit 901 for output.

The UE 900 may further include at least one sensor 905, for example, an optical sensor, a motion sensor, and other sensors. For example, the optical sensor includes an ambient light sensor and a proximity sensor. The ambient light sensor may adjust luminance of a display panel 9061 according to brightness of ambient light. The proximity sensor may switch off the display panel 9061 and/or backlight when the UE 900 is moved to the ear. As one type of motion sensor, an accelerometer sensor may detect a magnitude of acceleration in various directions (generally, three axes), and may detect a magnitude and a direction of gravity when static, which may be configured to recognize UE gestures (for example, horizontal and vertical screen switching, related games, and magnetometer posture calibration), vibration recognition related functions (for example, pedometer and tap), and the like. The sensor 905 may further include a fingerprint sensor, a pressure sensor, an iris sensor, a molecular sensor, a gyroscope, a barometer, a hygrometer, a thermometer, and an infrared sensor. Details are not described herein.

The display unit 906 is configured to display information input by the user or information provided for the user. The display unit 906 may include a display panel 9061, which may be configured by using a liquid crystal display (LCD), an organic light-emitting diode (OLED), or the like.

The user input unit 907 may be configured to receive inputted digital or character information, and generate a key signal input related to user settings and function control of the UE. For example, the user input unit 907 includes a touch panel 9071 and another input device 9072. The touch panel 9071, also referred to as a touchscreen, may collect a touch operation of a user on or near the touch panel (for example, an operation of a user on the touch panel 9071 or near the touch panel 9071 by using any suitable object or accessory such as a finger or a stylus). The touch panel 9071 may include a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then sends the contact coordinate to the processor 910, and receives and executes a command sent by the processor 910. In addition, the touch panel 9071 may be of a resistive type, a capacitive type, an infrared type, or a surface acoustic wave (SAW) type. In addition to the touch panel 9071, the user input unit 907 may further include the another input device 9072. For example, the another input device 9072 includes, but is not limited to, a physical keyboard, a functional key (for example, a volume control key or a switch key), a trackball, a mouse, and a joystick. Details are not described herein again.

Optionally, the touch panel 9071 may cover the display panel 9061. After detecting a touch operation on or near the touch panel 9071, the touch panel transfers the touch operation to the processor 910, so as to determine a type of the touch event. Then, the processor 910 provides corresponding visual output on the display panel 9061 according to the type of the touch event. Although, in FIG. 9, the touch panel 9071 and the display panel 9061 are used as two separate parts to implement input and output functions of the UE, in some embodiments, the touch panel 9071 and the display panel 9061 may be integrated to implement the input and output functions of the UE, which is not limited herein.

The interface unit 908 is an interface used for connecting an external apparatus to the UE 900. For example, the external apparatus may include a wired or wireless headset port, an external power supply (or a battery charger) port, a wired or wireless data port, a storage card port, a port used to for connecting an apparatus having an identification module, an audio input/output (I/O) port, a video I/O port, an earphone port, and the like. The interface unit 908 may be configured to receive an input (for example, data information or power) from the external apparatus, and transmit the received input to one or more elements in the UE 900, or may be configured to transmit data between the UE 900 and the external apparatus.

The memory 909 may be configured to store a software program and various data. The memory 909 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 909 may include a high speed random access memory, and may further include a non-volatile memory, for example, at least one magnetic disk storage device, a flash memory device, or another non-volatile solid state storage device.

The processor 910 is the control center of the UE, and is connected to various parts of the UE by using various interfaces and lines. By running or executing the software program and/or module stored in the memory 909, and invoking data stored in the memory 909, the processor performs various functions and data processing of the UE, thereby performing overall monitoring on the UE. The processor 910 may include one or more processing units. Optionally, the processor 910 may integrate an application processor and a modem processor, where the application processor mainly processes an operating system, a user interface, an application program, and the like, and the modem processor mainly processes wireless communications. It may be understood that the foregoing modem may either not be integrated into the processor 910.

The UE 900 may further include the power supply 911 (such as a battery) for supplying power to the components. Optionally, the power supply 911 may be logically connected to the processor 910 by using a power management system, thereby implementing functions such as charging, discharging, and power consumption management by using the power management system.

In addition, the UE 900 includes some functional modules that are not shown. Details are not described herein again.

An embodiment of the present disclosure further provides a network device, including a processor, a memory, and a computer program stored in the memory and executable on the processor, where when the computer program is executed by the processor, various processes of the embodiments of the foregoing resource allocation method are implemented, and can achieve the same technical effects. To avoid repetition, details are not described herein again.

An embodiment of the present disclosure further provides a non-transitory computer-readable storage medium, storing a computer program, where when the computer program is executed by a processor, various processes of the foregoing resource request method or the foregoing resource allocation method are implemented, and can achieve the same technical effects. To avoid repetition, details are not described herein again. The non-transitory computer-readable storage medium includes, for example, a read-only memory (ROM), a random access memory (RAM), a magnetic disk, or an optical disc.

It should be noted that, the terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses. In addition, the relational terms such as "first" and "second" are only used to differentiate an entity or operation from another, and do not necessarily require or imply any actual relationship or sequence between these entities or operations.

According to the descriptions in the foregoing implementations, a person skilled in the art can clearly learn that the foregoing embodiment methods may be implemented by using software in combination with a necessary universal hardware platform. Certainly, the embodiment methods may also be implemented by using hardware, software, or a combination of the two, but the former is a preferred implementation in many cases. Based on such an understanding, the technical solutions of the present disclosure essentially or the part contributing to the existing technology may be implemented in a form of a software product. A computer software product is stored in a storage medium (for example, a ROM/RAM, a magnetic disk, or an optical disc) and includes several instructions for instructing a terminal (a mobile phone, a computer, a server, an air conditioner, or a network device) to perform the methods described in the embodiments of the present disclosure.

The embodiments of the present disclosure have been described above with reference to the accompanying drawings. The present disclosure is not limited to the embodiments described above, and the embodiments described above are merely exemplary and not limitative. A person of ordinary skill in the art may make various variations under the teaching of the present disclosure without departing from the spirit of the present disclosure and the protection scope of the claims, and such variations shall all fall within the protection scope of the present disclosure.

What is claimed is:

1. A resource request method, applied to a remote user equipment, the method comprising:
   receiving information about a scheduling request (SR) resource configured by a network device;
   sending a first SR on the SR resource in a case that an uplink resource of the remote user equipment is insufficient to send a first buffer status report (BSR), the first SR being used for requesting the network device to allocate a resource used for sending the first BSR to the remote user equipment, the first BSR being used for requesting the network device to allocate a first resource and a second resource, the first resource being a resource used for data transmission from the remote user equipment to a relay user equipment, and the second resource being a resource used for data transmission from the relay user equipment to the network device;
   receiving information about the resource used for sending the first BSR sent by the network device; and
   canceling sending of all pending SRs and/or stopping an SR prohibit timer in a case that the remote user equipment meets a condition for canceling SRs; wherein
   the condition for canceling SRs comprises at least one of:
   reselecting a relay user equipment, stopping a relay operation, or switching from a relay communication mode to a non-relay communication mode.

2. The method according to claim 1, wherein the all pending SRs comprise the first SR.

3. A user equipment, comprising a processor, a memory, and a computer program stored in the memory and executable on the processor, wherein when the computer program is executed by the processor, steps of the resource request method according to claim 2 are implemented.

4. A non-transitory computer-readable storage medium, storing a computer program, wherein when the computer program is executed by a processor, steps of the resource request method according to claim 2 are implemented.

5. A user equipment, comprising a processor, a memory, and a computer program stored in the memory and executable on the processor, wherein when the computer program is executed by the processor, steps of the resource request method according to claim 1 are implemented.

6. A non-transitory computer-readable storage medium, storing a computer program, wherein when the computer program is executed by a processor, steps of the resource request method according to claim 1 are implemented.

7. A resource request method, applied to a remote user equipment, the method comprising:
   receiving information about a scheduling request (SR) resource configured by a network device;
   sending a second SR on the SR resource in a case that an uplink resource of the remote user equipment is insufficient to send a second buffer status report (BSR) and/or a third BSR, the second SR being used for requesting the network device to allocate a resource used for sending the second BSR and the third BSR to the remote user equipment, the second BSR being used for requesting the network device to allocate a first resource, the third BSR being used for requesting the network device to allocate a second resource, the first resource being a resource used for data transmission from the remote user equipment to a relay user equipment, and the second resource being a resource used for data transmission from the relay user equipment to the network device;
   receiving information about the resource used for sending the second BSR and the third BSR sent by the network device; and
   canceling sending of all pending SRs and/or stopping an SR prohibit timer in a case that the remote user equipment meets a condition for canceling SRs; wherein
   the condition for canceling SRs comprises at least one of:
   reselecting a relay user equipment, stopping a relay operation, or switching from a relay communication mode to a non-relay communication mode.

8. The method according to claim 7, wherein the all pending SRs comprise the second SR.

9. A user equipment, comprising a processor, a memory, and a computer program stored in the memory and executable on the processor, wherein when the computer program is executed by the processor, steps of the resource request method according to claim 8 are implemented.

10. A user equipment, comprising a processor, a memory, and a computer program stored in the memory and executable on the processor, wherein when the computer program is executed by the processor, steps of the resource request method according to claim 7 are implemented.

11. A non-transitory computer-readable storage medium, storing a computer program, wherein when the computer program is executed by a processor, steps of the resource request method according to claim 7 are implemented.

12. A resource allocation method, applied to a network device, the method comprising:
   sending information about a scheduling request (SR) resource to a remote user equipment;
   receiving a first SR or a second SR sent by the remote user equipment on the SR resource; wherein the first SR is used for requesting the network device to allocate a resource used for sending a first buffer status report (BSR) to the remote user equipment, the first BSR is used for requesting the network device to allocate a first resource and a second resource, the second SR is used for requesting the network device to allocate a resource used for sending a second buffer status report (BSR) and a third BSR to the remote user equipment, the second BSR is used for requesting the network device to allocate a first resource, the third BSR is used for requesting the network device to allocate a second resource, the first resource is a resource used for data transmission from the remote user equipment to a relay user equipment, and the second resource is a resource used for data transmission from the relay user equipment to the network device;

in a case where a first SR sent by the remote user equipment on the SR resource is received, allocating, according to the first SR, the resource used for sending the first BSR; and sending information about the resource used for sending the first BSR to the remote user equipment;

in a case where a second SR sent by the remote user equipment on the SR resource is received, allocating, according to the second SR, the resource used for sending the second BSR and the third BSR; and sending information about the resource used for sending the second BSR and the third BSR to the remote user equipment;

wherein sending of all pending SRs is cancelled and/or an SR prohibit timer is stopped in a case that the remote user equipment meets a condition for canceling SRs; wherein the condition for canceling SRs comprises at least one of:

reselecting a relay user equipment, stopping a relay operation, or switching from a relay communication mode to a non-relay communication mode.

13. A network device, comprising a processor, a memory, and a computer program stored in the memory and executable on the processor, wherein when the computer program is executed by the processor, steps of the resource allocation method according to claim 12 are implemented.

14. A non-transitory computer-readable storage medium, storing a computer program, wherein when the computer program is executed by a processor, steps of the resource allocation method according to claim 12 are implemented.

* * * * *